Patented June 24, 1930

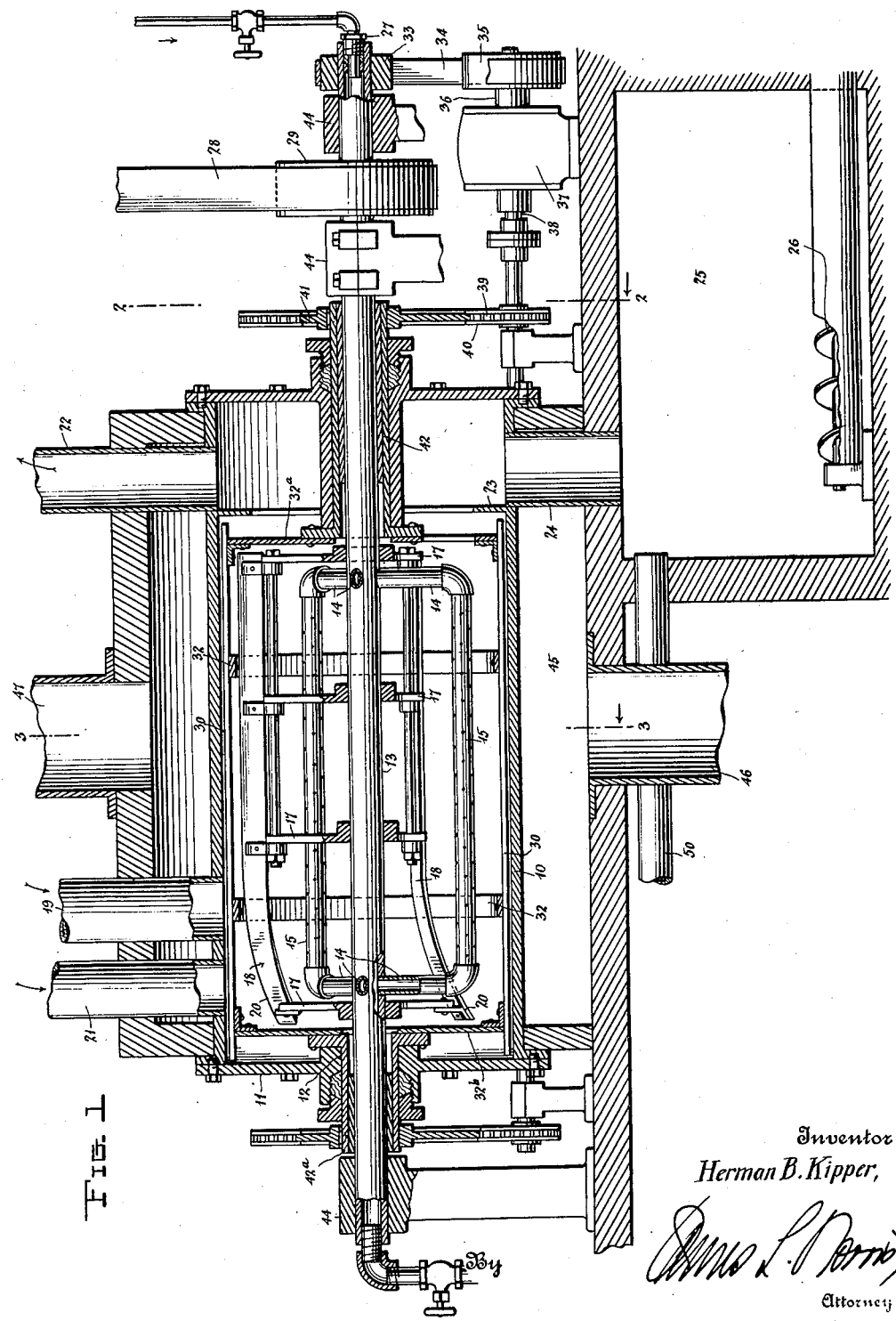

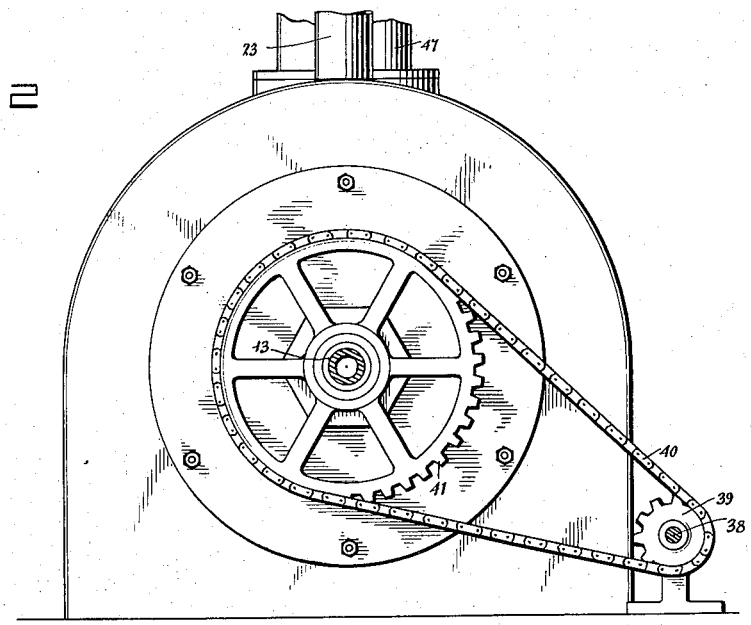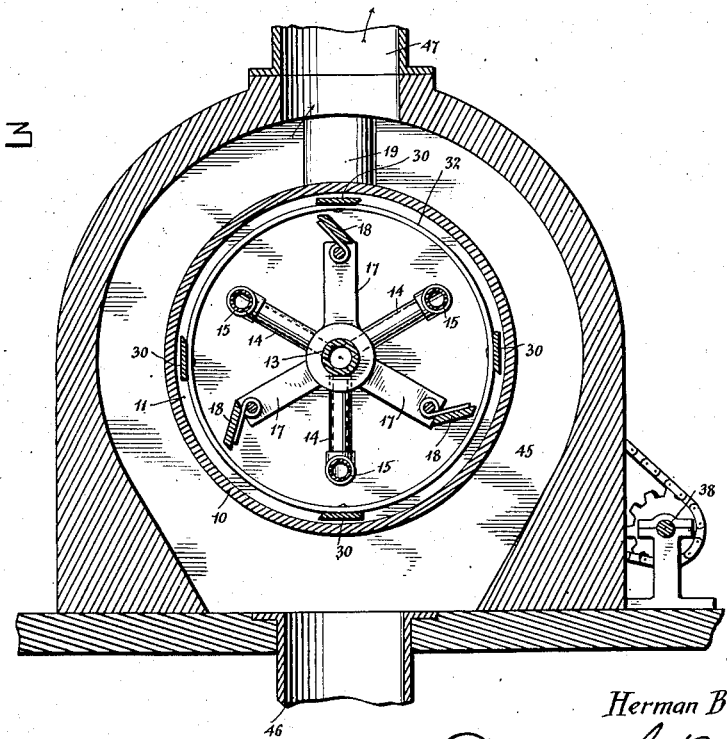

1,768,075

UNITED STATES PATENT OFFICE

HERMAN B. KIPPER, OF MUSKEGON, MICHIGAN

MANUFACTURE OF FERTILIZER SALTS

Application filed January 14, 1928. Serial No. 246,807.

The present invention relates to the manufacture of fertilizing salts such as ammonium sulphate and ammonium phosphate, by interaction of gypsum or calcium phosphate on the one hand, with carbon dioxide and ammonia on the other hand, the reaction being carried out in the presence of water, and the reaction mixture being very intimately brought into contact with the reacting gases, while in a heated state.

It has heretofore been proposed to make ammonium sulphate by reacting upon a sludge of calcium sulphate, in the form of burnt gypsum, in the presence of water, with ammonia and carbon dioxide, but the processes heretofore proposed have not given entirely satisfactory results in practice, since it has generally not been possible to carry the reaction to a sufficient degree of completion, thereby causing considerable loss of materials.

In accordance with the present invention, I have found that the reaction can be carried to completion or substantially to completion, by maintaining the liquid sludge at a sufficiently high temperature, and by giving a sufficient contact of the sludge with the reacting gases, preferably by converting the sludge and maintaining the sludge in the condition of almost a mist in the reaction chamber through which the gases travel.

In the annexed drawing forming part of this specification, Fig. 1 is a longitudinal section of the essential portions of the reaction apparatus.

Fig. 2 is a section showing the means for operating the stirring apparatus and the scraping apparatus, the section being taken approximately on the plane 2—2 shown in Fig. 1.

Fig. 3 is a section through the reaction chamber showing the agitators, beaters and sprayers and scrapers.

Referring now in detail to the apparatus shown in the drawings, a stationary boiler-like reaction vessel 10 is provided, constituting the main reaction chamber. One end of the receptacle 10 is entirely closed by a plate 11 having a central opening therein 12, through which extends a steam pipe 13, having a plurality of radial branches 14, opposite ones of which are connected by perforated pipes 15, for introducing superheated steam from the pipe 13 into and through the liquid sludge in the reaction vessel 10. Carried upon the pipe 13 are a number of arms 17 to the ends of which are attached agitating members 18, for the purpose of thoroughly agitating the liquor, and for beating the same up into the form of substantially a mist or spray in the reaction chamber. The calcium sulphate, or the sludge of calcium sulphate in water, is introduced through pipe 19 at the left hand end of the receptacle 10, and, in order to assist this to progress lengthwise through the reacting chamber 10, the ends 20 of the agitator blades 18 are curved as shown in Fig. 1. Gases containing ammonia and carbon dioxide are introduced through the pipe 21 adjacent one end of the reaction vessel 10, and the unused gases find exit through the flue 22 at the opposite end of said vessel, which may lead to another reaction vessel for the purpose of recovering any ammonia still remaining in the gases.

The right hand end of the reaction vessel 10, as shown in Fig. 1 is largely open, but is provided with an annular partial closure 23 through which the excess of gases find exit, and over the lower edge of which the liquid or sludge flows, the latter to find exit through the pipe 24 into a settling or crystallizing tank 25. The material is drawn off from this latter tank by the conveyer 26 to suitable purifying, concentrating or drying apparatus, depending upon the grade of purity required in the ammonium sulphate product.

Since agitation is necessary for converting the sludge into a mist, this agitation is furnished by rapid rotation of the pipe 13 carrying the agitators 18 and the pipes 15 above described. For this purpose the end 27 of a superheated steam line 16 projects into one end of the pipe 13 through a stuffing box and any suitable means, such as the belt 28 and pulley 29, may be provided for imparting a high speed of rotation to the pipe 13 and the above mentioned members carried thereby. In practice I find that a speed of revolution of 600 revolutions per minute is very satisfactory for this purpose. The handling of a sludge in this manner is likely to cause considerable deposition of solid material upon the wall of the vessel 10, and in order to prevent any excess of such accumulation, scrapers 30 are also mounted inside of the reaction vessel. The scrapers 30 are connected by suitable rings 32 and are caused to rotate in the reaction vessel 10 and rotate at a slow speed, say one or two revolutions per minute.

Rotation is imparted to the scrapers 30 by any suitable means.

The means shown for this purpose is as follows:—

A pulley 33 is secured to the pipe 13 adjacent one of its ends and a belt 34 passes over said pulley and a pulley 35 secured to the shaft 36 of a reducing gear 37. The countershaft 38 of the reducing gear 37 carries a sprocket wheel 39. A chain 40 passes over the sprocket wheel 39 and a sprocket wheel 41 carried by a sleeve 42 which surrounds and is rotatable on the pipe 13 and extends into the reaction vessel 10. Arms 32$^a$ extending radially from the sleeve 42 are each connected to one end of one of the scrapers 30, and the opposite end of each of the scrapers 30 is connected to one of a series of similar arms 32$^b$ extending radially from a sleeve 42$^a$ which extends through the end wall 11 of the reaction vessel and surrounds and is rotatable on the pipe 13.

The pipe 13 is mounted in suitable bearings 44 for supporting this pipe and the elements carried thereby as above indicated.

In carrying out the process, either burnt or ground gypsum may be used as the initial solid material introduced at 21, this being simply crushed to a fine state of division, and suspended in sufficient water to produce a sludge which will flow readily when leaving the apparatus. I have found that a sludge of 1 part of gypsum to 4 parts of water will permit a ready flow of the materials, but that a sludge of 1 part of gypsum to 3 parts of water will work satisfactorily and is to be preferred because of its higher concentration. Instead of using pure water, mother liquors, wash waters, etc., produced in the process may be employed.

I may call attention to the fact that the calcium sulphate may be ordinary uncalcined gypsum, ground to a powder. It is not necessary to previously calcine same, although such treatment is not precluded.

The gas entering by pipe 21 may contain both carbon dioxide and ammonia if desired, or in some cases the ammonia can be first removed from the gases, say coke oven gases, by washing in water, and this water can be supplied either through pipe 21 or pipe 19, or the water containing the ammonia may be used for suspending the gypsum. By the intensive heating and agitating in the receptacle 10, the sludge of gypsum and water is converted almost wholly into a fine mist, which is brought into very intimate contact with the gases flowing through the apparatus.

Although for some reasons it may be desirable to heat the mixture of water and gypsum, this is not always necessary. The operation, when using gypsum, may be carried out at say 20 to 35° C., although there is no objection to a higher temperature, say up to 60° C., if desired.

As above stated, the sludge at the end of the reaction period overflows the annular dam 23, and falls through the pipe 24 into the receptacle 25, from which it is removed through the casing of the helical conveyer 26, to a suitable filtering apparatus, for example a rotary filter, after which the solid, consisting essentially of calcium carbonate, is washed to remove adhering ammonium sulphate, and the wash waters, or some of them, can be used for making up the original sludge of calcium sulphate to be introduced through the pipe 19. The ammonium sulphate can thereafter be concentrated and crystallized and dried in any approved manner.

Instead of heating the reaction chamber solely by the steam, or as a substitute for this mode of heating, hot gases from any suitable source, for example coke ovens or the like, may enter the space 45, surrounding this reaction chamber, from flue 46 and leave through flue 47.

In a modified form of the process I can produce ammonium phosphate, say mono- and di-ammonium phosphate (the former being, if desired, later treated with ammonia to form diammonium phosphate), by substituting calcium phosphate, in the form of finely pulverized phosphate rock, in aqueous suspension, instead of the suspension of gypsum. In such a process I would preferably use one part of calcium phosphate to about 3 to 5 parts of water, in mixing up the original sludge to be employed. In this modification, a temperature of 30 to 60° C. gives very satisfactory results.

Likewise, instead of using the phosphate rock alone, I can mix this with a quantity of calcium sulphate, say gypsum, and treat the mixture of calcium phosphate and sulphate by the process, to produce a mixture of ammonium phosphate and ammonium sulphate, for use in the fertilizer industry.

The apparatus described and shown herein is not claimed in the present application, but in my co-pending applications Nos. 696,485 and 739,040, of which the present application is in part a continuation.

The entire apparatus may be made of iron or steel, although alloys which are more resistant can be used if desired. Thus the receptacle 10 and the parts therein can be made of the nickel alloy "Hybnickel alloy."

I have above referred to the introduction of steam through the hollow shaft 13, but it will be understood that other hot gases can be similarly introduced if desired, and these gases may, if desired, contain the carbon dioxide for effecting the reaction or a portion of the same.

The gases introduced through pipe 21 may conveniently be coke oven gas, coal gas or the like, and if these gases do not contain a sufficient amount of carbon dioxide, this latter can be added thereto, either as carbon dioxide or as chimney gases, lime kiln gases or the like, if available.

I have above referred to withdrawing the entire material from tank 25 through the conveyer 26. If desired, however, a large quantity of material may be maintained in the tank 25 in order to allow the calcium carbonate to settle out therein, and this settled out calcium carbonate may be withdrawn through the conveyer 26, while the more or less clear liquor is withdrawn through pipe 50, to a filter or evaporating pan, vacuum pan and the like.

I claim:—

In the process of manufacturing ammonium salts from gypsum and phosphate rock by reaction therewith with ammonia, carbon dioxide and water, the step which comprises beating such reaction mixture to a fine mist in the presence of steam in order to facilitate the chemical reaction between the constituents, and then separating the soluble from the insoluble salts.

In testimony whereof I have hereunto set my hand.

HERMAN B. KIPPER.